(12) United States Patent
Specht

(10) Patent No.: US 6,598,821 B2
(45) Date of Patent: Jul. 29, 2003

(54) SEAT BELT RETRACTOR

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 94 days.

(21) Appl. No.: 09/872,557

(22) Filed: Jun. 1, 2001

(65) Prior Publication Data

US 2002/0017584 A1 Feb. 14, 2002

(30) Foreign Application Priority Data

Aug. 11, 2000 (DE) .......................... 100 39 364

(51) Int. Cl.[7] ............................................... B65H 75/48
(52) U.S. Cl. ..................................... 242/374; 242/375.1
(58) Field of Search ............................... 242/374, 375.1

(56) References Cited

U.S. PATENT DOCUMENTS 4,678,134 A    7/1987 Ameur
5,671,894 A  * 9/1997 Dybro et al. ............... 242/374
5,788,281 A    8/1998 Yanagi et al. ............... 280/806
6,343,759 B1 * 2/2002 Specht ..................... 242/375.1
6,390,403 B2 * 5/2002 Specht ....................... 242/374

FOREIGN PATENT DOCUMENTS

| DE | 19640842 | 4/1998 |
| DE | 19731689 | 2/1999 |
| DE | 10001840 | 7/2000 |
| GB | 2345890  | 7/2000 |

* cited by examiner

Primary Examiner—William A. Rivera
(74) Attorney, Agent, or Firm—Lonnie R. Drayer

(57) ABSTRACT

A seat belt retractor has a winding reel rotatably mounted in a frame, an electric motor and a switching mechanism, with which varying torques can be transmitted to the winding reel to adjust the comfort of a wearer of the seat belt or to tighten the seat belt. The switching mechanism is automatically directed into a switch position set for the comfort perceived by the wearer of the seat belt and into a switch position for belt tightening, in which if necessary an adjustable load limitation is also achieved.

18 Claims, 6 Drawing Sheets

SEAT BELT RETRACTOR

FIELD OF THE INVENTION

The present invention relates to a seat belt retractor.

DISCUSSION OF THE PRIOR ART

EP 0893313 A1 teaches a seat belt retractor wherein the winding reel of a seat belt retractor is loaded with varying torques generated by an electric motor. The respective torques are transmitted via a mechanical switching mechanism whereby, depending on the respective switch position, the comfort perceived by the wearer of the seat belt, the belt webbing tightening, or a belt force limitation can be obtained.

There is provided in accordance with the present invention a seat belt retractor having a switching mechanism that is operated dependent on the number of revolutions, or dependent on the change in number of revolutions, with which the torque generated by the electric motor is transferred to the winding reel. A torque transferred with a low number of revolutions, respectively a low change in number of revolutions, causes the switching mechanism to assume a switch position ensuring the comfort perceived by the wearer of the seat belt, and a torque transferred with a higher number of revolutions causes the switching mechanism to assume a switch position ensuring the tightening of the belt.

DETAILED DESCRIPTION OF THE INVENTION

Figure 1:
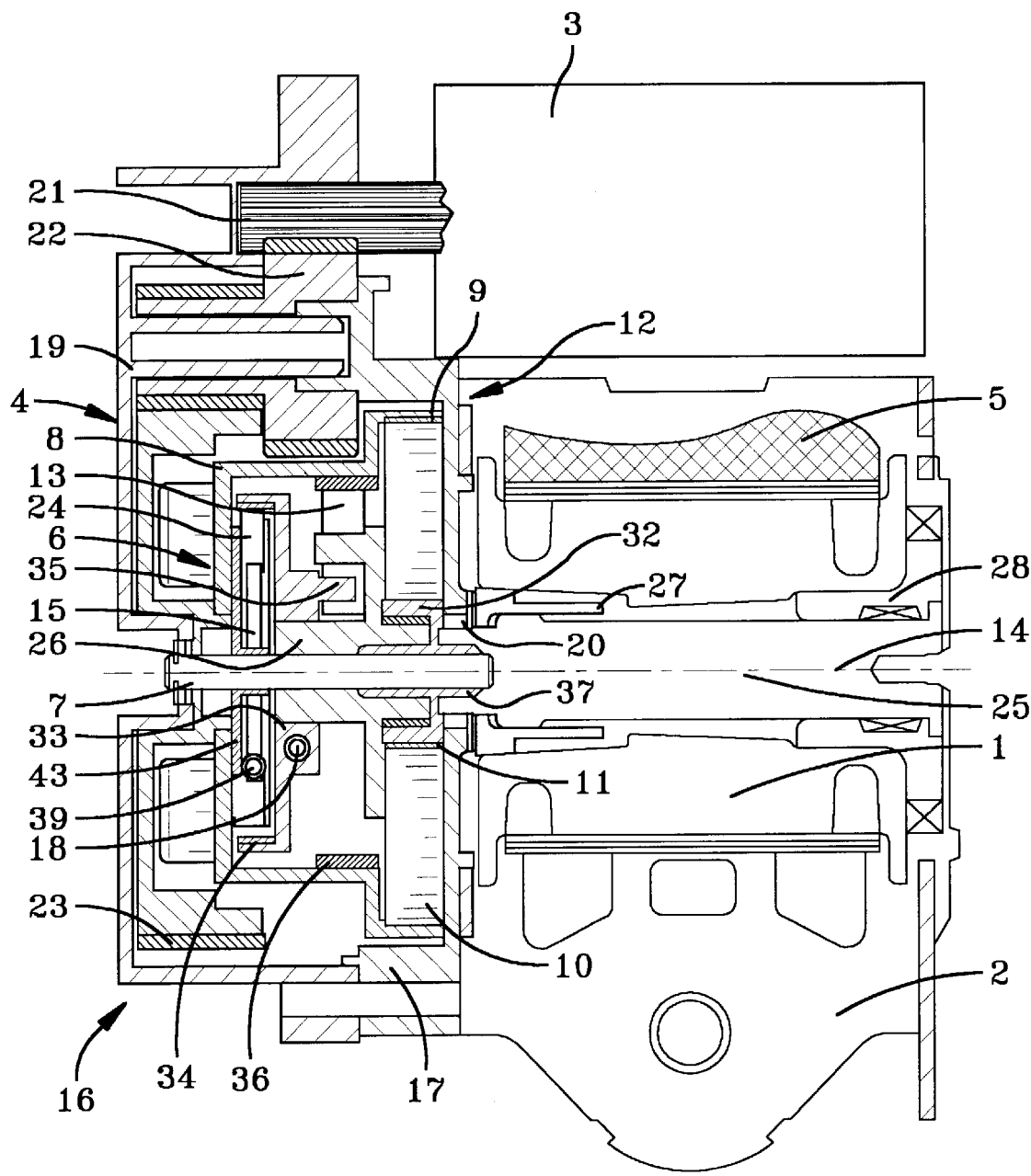
FIG. 1 is a sectional view of a seat belt retractor according to a first embodiment of the invention.

The embodiments of the present invention represented in the drawings each comprise a seat belt retractor 5 with a winding reel 1 rotatably mounted on a frame 2. In accordance with the switch positions of a switching mechanism 4, an electric motor 3 transmits varying torques to the winding reel and thus to the seat belt. EP 0893313 A1 teaches that a torque can be transmitted for the adjustment of the comfort perceived by the wearer of a fastened seat belt, or for the tensioning of the seat belt, or for the adjustment of a load limiter 25 in the case of a blocked winding reel 1 and forward displacement of the vehicle occupant. It is also possible for the respective embodiments of FIGS. 1 to 5 to be made so that only one or two of the above mentioned adjusted switch positions or torques are transmitted to the winding reel and seat belt.

If the number of revolutions or the change in number of revolutions of a driving part 8 is so low that a sensor mass 15, which is preferably held back by a sensor spring 39, does not move relative to the driving part, but instead is moved along with it, the restoring force of a motive spring 10 is adjusted. This enables the comfort perceived by the wearer of the seat belt to be adjusted, for instance through a decrease in the retracting force of the motive spring. It is possible to increase the retracting force of the motive spring by rotating the driving part in the opposite direction, for instance to return the seat belt to its parked position. The seat belt can be returned to the parked position by engaging a coupling device 6. The required torque is then transferred from the electric motor via the coupling device to the winding reel.

In the represented embodiments the switching mechanism 4 can be automatically adjusted to a respective switch position, dependent on the number of revolutions or the change in number of revolutions. A lower number of revolutions or a smaller change in number of revolutions causes the switching mechanism to assume a switch position in which the comfort perceived by the wearer of the fastened seat belt 5 is adjusted. To this effect the restoring force of a motive spring 10 can be preferably reduced. This ensures that the torque generated by the electric motor 3 via a motor shaft 21 is transferred to the driving part 8 via a reduction gear. The reduction gear comprises a gear wheel 22 meshing with the motor shaft and a gear wheel 23 non-rotatably mounted on the driving part. The driving part is rotatably mounted around a rotational axis 14 co-axial to the winding reel axis.

The driving part 8 forms part of a motive spring housing 12 and embraces the motive spring 10 around its circumference. An outer fixing point 9 of the motive spring is firmly connected to the driving part. An inner fixing point 11 of the motive spring is firmly connected to a spring core 32, which is non-rotatably connected to an axial projection 7 of the winding reel 1. In this way, the restoring force of the motive spring 10 is transferred to the winding reel.

The rotation of the motor shaft 21 in an opposite direction allows the motive spring 10 to adjust to its normal restoring force and, if necessary, the restoring force of the motive spring can be increased by further rotation. This is advantageous when the seat belt is returned to into its parked position when removed. The seat belt can be kept tightly in the parked position by an increase of the restoring force of the motive spring. The switching mechanism can comprise an automatic engageable coupling device 6 that transmits the torque from the electric motor 3. In addition, corresponding adjustment of the restoring force of the motive spring or an engaged coupling device can ease the application of the seat belt through an appropriate torque.

To tighten the seat belt, the electric motor 3 generates a torque at a higher or rapidly increasing number of revolutions, which is transferred from the motor shaft 21 via gear wheels 22, 23 to the driving part 8. An engagement part 24, for instance a pawl that can be biased into a rest position by a spring, can be movably, particularly rotatably, mounted on the driving part, for instance via a bearing part 43. The coupling element can be automatically engaged dependent on the revolutions or the change in number of revolutions of the driving part. To this effect the engageable coupling element, as a result of an inertial moment of a sensor mass 15 that is located at a distance from rotational axis 7, can be pivotally or rotatably mounted on the driving part 8.

In a preferred embodiment the coupling element 13 can be controlled by pre-blocking device. In the latter, an engagement part comes into a pre-blocking engagement with a control part by a sensor mass 15. This pre-blocking ensures that the driving part 8 is non-rotatably connected to the control part 33. The rotation of the driving part results in the co-rotation of the control part, which causes at least the one coupling element to be engaged. The engagement with the control part and thus the connection of the control part with the driving part can occur in that at least the one coupling element synchronously engages the driving part. The sensor mass 15 can comprise a separate sensor mass acting upon the engagement part or a sensor mass that is integral with the pre-blocking engagement part and acts upon the latter via centrifugal or inertial force.

In the embodiments represented in FIGS. 1 to 3 and 5, a sensor spring 39 acts between the sensor mass and the driving part 8. Due to its inertial mass, the sensor mass 15 initially does not rotate with the driving part, resulting in a relative movement occurring between the sensor mass and the driving part as well as the engagement part 24. This relative movement between the engagement part and the sensor mass causes the engagement part to enter into a pre-blocking engagement with the control part 33. In the represented embodiments, the sensor mass acts like an angle acceleration sensor. In the represented embodiments, the control part 33 is shown as a control wheel, which is rotatably mounted on the axial projection 7 extending from and coaxial with the winding reel 1. The engagement part 24 can be one or several movable pawls, which enter into engagement with peripheral gear teeth 34 at the control part (control wheel). The rotational movement of the driving part 8 is transferred to the control part 33.

The control part 33 comprises a coupling actuation part 35. The rotational movement generated by the driving part 8 is transferred by the coupling actuation part to at least one coupling element 13, for instance by a pivotal pawl. The coupling element is movably mounted on a carrier 26 that is non-rotatably linked to the winding reel, in particular via the axial projection 7. The coupling element engages the driving part 8. The driving part can have peripheral gear teeth 36. It is preferable that the gear teeth 34, 36 are designed so that a synchronous coupling engagement of the coupling element 13 is achieved.

Figure 4:
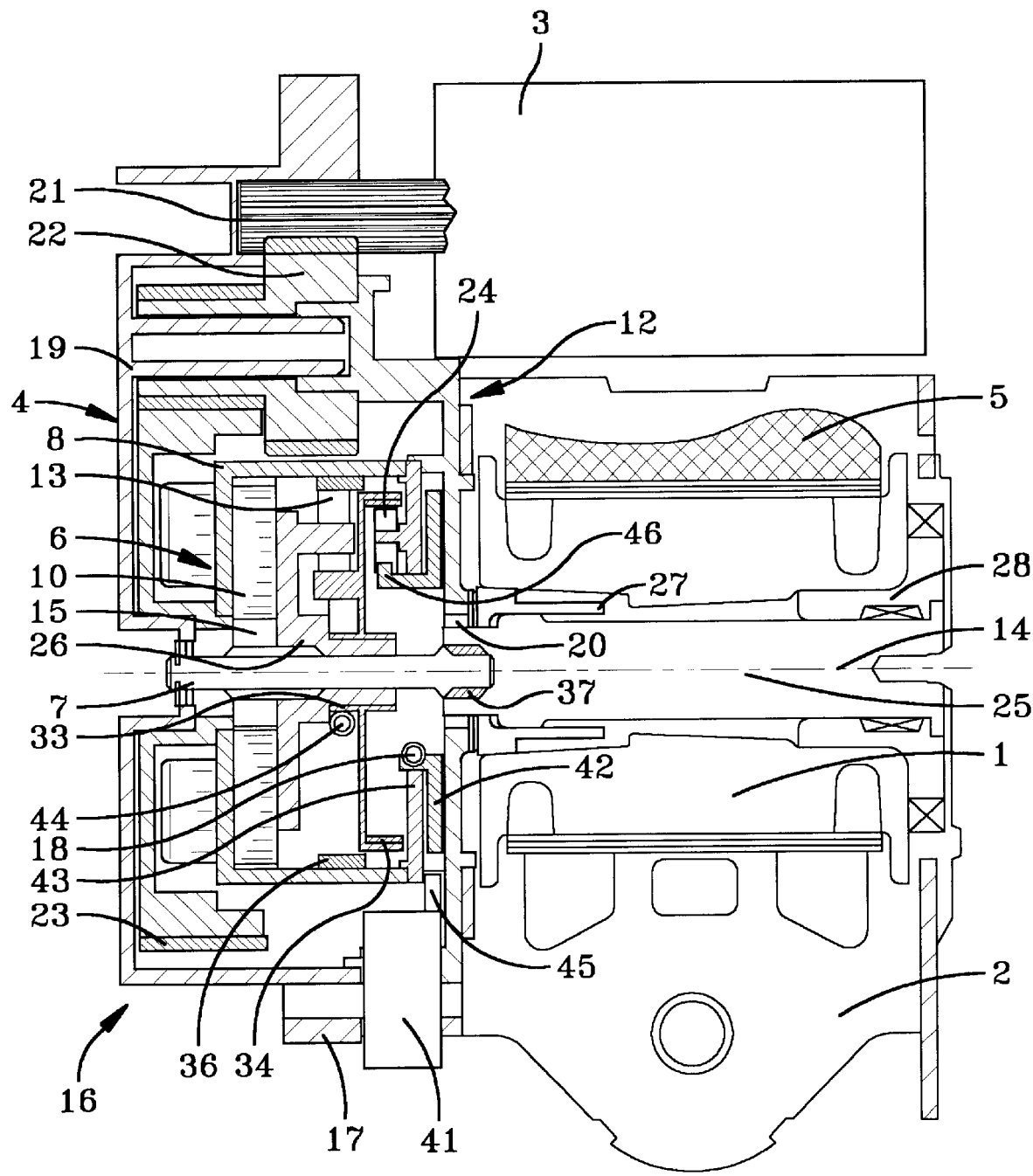
FIG. 4 is a sectional view of a seat belt retractor according to a fourth embodiment of the invention.

As will be described below, the pre-blocking device can alternatively comprise a vehicle-sensitive acceleration sensor 31, via which the coupling element can be engaged. The pre-blocking device can furthermore comprise an electro-magnet 41 as shown in FIG. 4.

The engagement of the coupling element 3 with the gear teeth 36 of the driving part 8 ensures that the driving part is non-rotatably connected to the winding reel 1 via the carrier 26 and the axial projection 7. The torque transferred from the electric motor 3 via the gear mechanism, that is to say the gear wheels 22, 23, to the driving part is coupled to the winding reel and preferably is used to tighten the seat belt.

Tightening of the seat belt 5 can be a power tightening that pulls the vehicle occupant wearing the seat belt back into the vehicle seat in the event of a crash. It can also comprise a reversible tightening of the seat belt 5, which takes place during a driving situation with a high chance of involving a crash. Such driving situations include emergency braking of the vehicle, skidding of the vehicle and the like. If in such a situation no crash occurs, the winding reel and the seat belt return to the normal seat belt comfort perceived by the wearer, with which the restoring force of the motive spring, set for comfort perceived by the wearer, acts upon the seat belt.

To provide a reversible belt tightening in driving situations with a high likelihood of a crash, the coupling device 6, after the belt tightening and the conclusion of the dangerous driving situation, can be disengaged by a restoring force generated by a restoring spring 10, or by a change in movement, for instance a change in direction of rotation, generated by the electric motor 3. The restoring force of the motive spring 10 then acts upon the winding reel and the seat belt once again. The torque is preferably transferred to the winding reel via a reduction gear mechanism.

Figure 7:
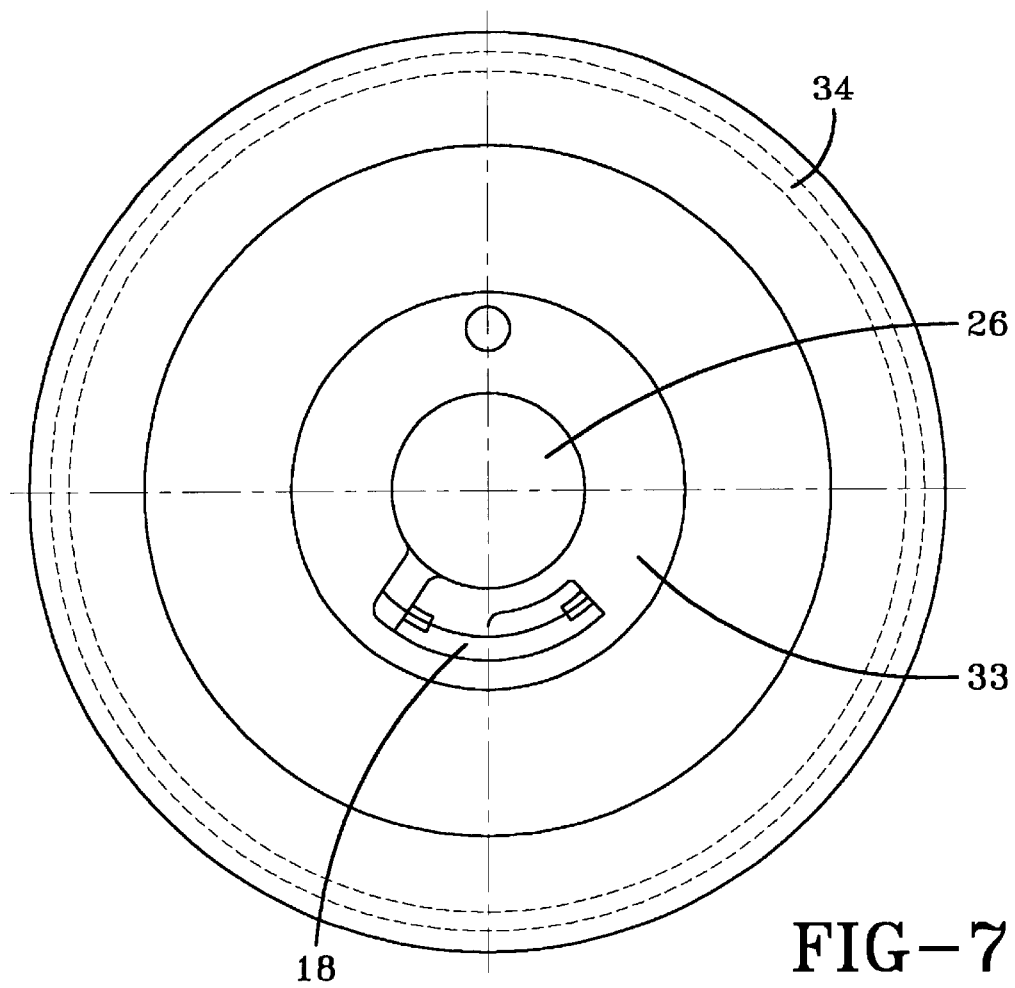
FIG. 7 shows an arrangement of another return spring.

To enable this return, a restoring spring 18 is provided, which acts for the coupling element 13 between the control part 33 and the carrier 26, as illustrated in more detail in FIG. 7. The force of the restoring spring returns the control part 33 to its original or normal position opposite the carrier 26, whereby the coupling element 13 is also disengaged. This results in the coupling element disconnecting from the gear teeth 36 at the driving part 36 and in the coupling device 6 being disengaged.

A sensor spring 39 acting between the driving part 8 and the sensor mass 15 (FIGS. 1 to 3 and 5) also generates a restoring force, whereby the sensor mass and the engagement part 24 are returned to their original or normal positions. FIG. 6 shows the sensor spring 39. The restoring function of the sensor mass 15 can also, however, be achieved without a sensor spring due to the restoring effects of the restoring spring 18. The coupling device 6 can be disengaged through a reversal in rotation by the electric motor 3.

As described above, the coupling device 6 operates like a switch coupling which, depending on the number of revolutions or the change in number of revolutions of the motor shaft 21, is engaged or remains disengaged. If the number of revolutions is low or the change in number of revolutions is small, the coupling device remains disengaged, so that the motor shaft 21 acts upon the restoring force of the motive spring 10 via the gear mechanism that comprises the gear wheels 22, 23 and the driving part 8. If the number of revolutions is higher or the change in number of revolutions is great, causing the sensor device to come into action, the coupling element 13 is engaged via a pre-blocking device. The motive spring is bridged and the driving part is non-rotatably connected to the winding reel 1. As stated above, the sensor device generating the pre-blocking comprises the sensor mass 15, the sensor spring 39 which acts upon the sensor mass and the engagement part 24. The coupling device 6 operates with the gear mechanism and provides both above-mentioned switch positions.

Since in the represented embodiment both the driving part 8 and the control part 33 comprise peripheral gear teeth 36, 34 and the pre-blocking engagement of the engagement part 24 with the peripheral gear teeth 34 at the control part 33 takes place in predetermined rotational angle positions, a synchronised engagement of the coupling element 13 with the peripheral gear teeth 36 at the driving part is achieved.

The engagement part 24 can be arranged such that, due to centrifugal force, it enters into engagement with the control part, in particular the peripheral gear teeth of the control part 33. A sensor spring can act upon the engagement part 24 and keep the engagement part from engaging the control part below a certain number of revolutions. When said number of revolutions is exceeded, the centrifugal force that acts upon the engagement part 24 surpasses the restoring force of the sensor spring, so that it engages with the control part. This ensures that the control part 33 is also non-rotatably connected to the driving part 8.

The seat belt retractor, which essentially comprises the winding reel 1 and the frame 2, in which the winding reel is rotatably mounted, furthermore comprises a load limiter 25 in the form of a torque rod. The load limiter extends in an axial direction into a hollow space of the winding reel 1. The winding reel acts as a load limiter or can be formed integrally with said torque rod. This enables the torque supplied by the electric motor to also be used for the adjustment of the belt force limitation.

Figure 2:
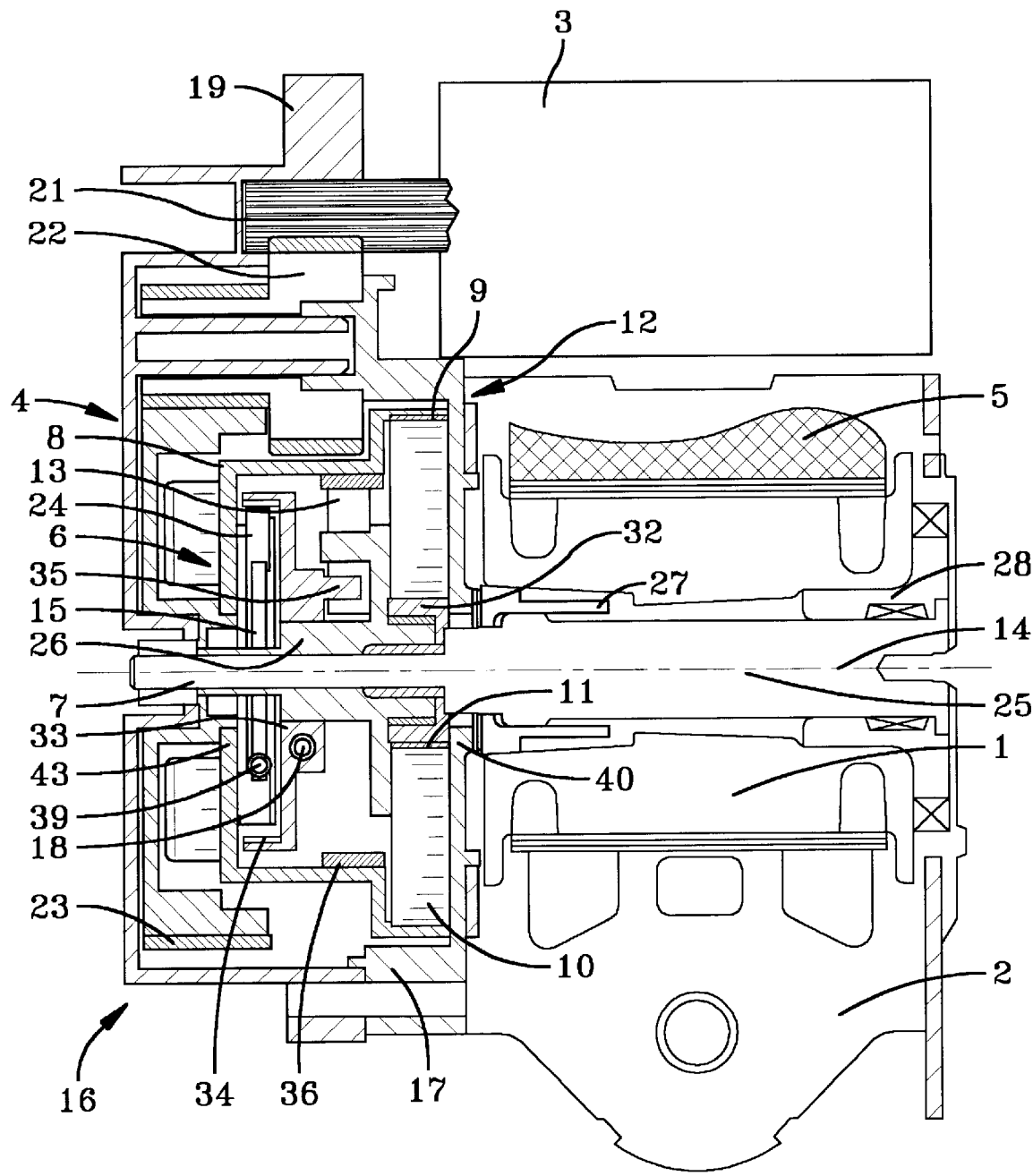
FIG. 2 is a sectional view of a seat belt retractor according to a second embodiment of the invention.
Figure 3:
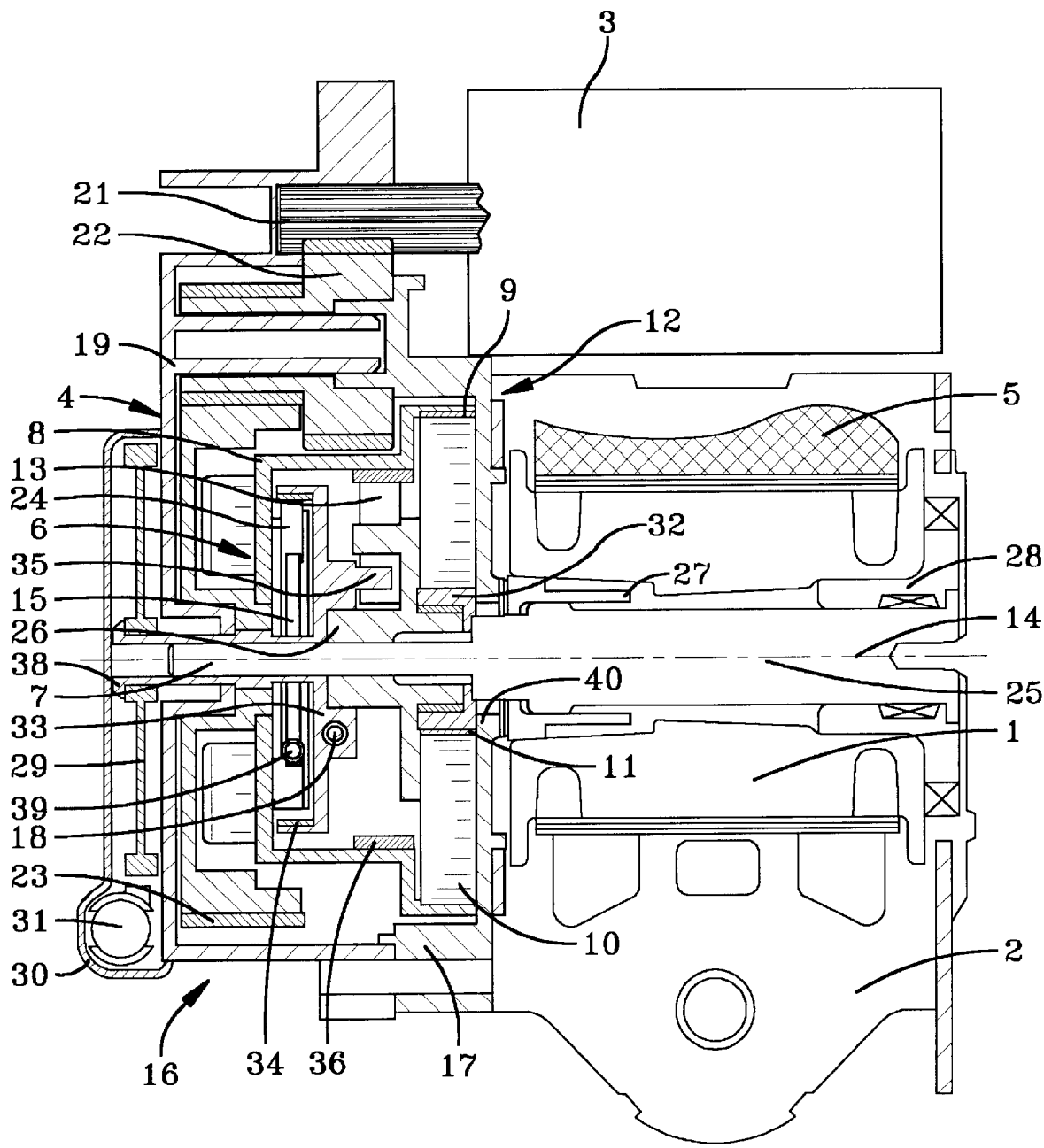
FIG. 3 is a sectional view of a seat belt retractor according to a third embodiment.

At the left end on each of the embodiments shown in FIGS. 1 to 3, the load limiter 25 is non-rotatably connected to the winding reel 1 in a fixed bearing 27. At its right end, the winding reel 1 is rotatably mounted in a movable bearing 28 opposite the load limiter. The right end of the load limiter is rotatably mounted on the frame 2 under normal driving conditions. In the represented embodiments, the axial projection 7 extends to and is coaxial with the load limiter.

In FIGS. 2 and 3, the axial projection 27 is integral to the load limiter. In the embodiments shown in FIGS. 1, 4 and 5, the axial projection 7 is non-rotatably connected to a connecting point 37 with the load limiter being a torque rod.

The switching mechanism 4 and the motive spring 10 as well as, if applicable, the reduction gear mechanism can be arranged as a modular unit, which is connected to the frame 2 via an adapter plate 17. This enables conventional seat belt retractors to be converted or updated with an automatically adjustable switching mechanism for the transmission of varying torques from the electric motor to the winding reel. With the adapter plate it is possible to provide different types of seat belt retractors with a switching mechanism 4. The adapter plate is preferably arranged on one of the two frame members, in particular on the frame member that is on the spring side of the seat belt retractor.

Figure 5:
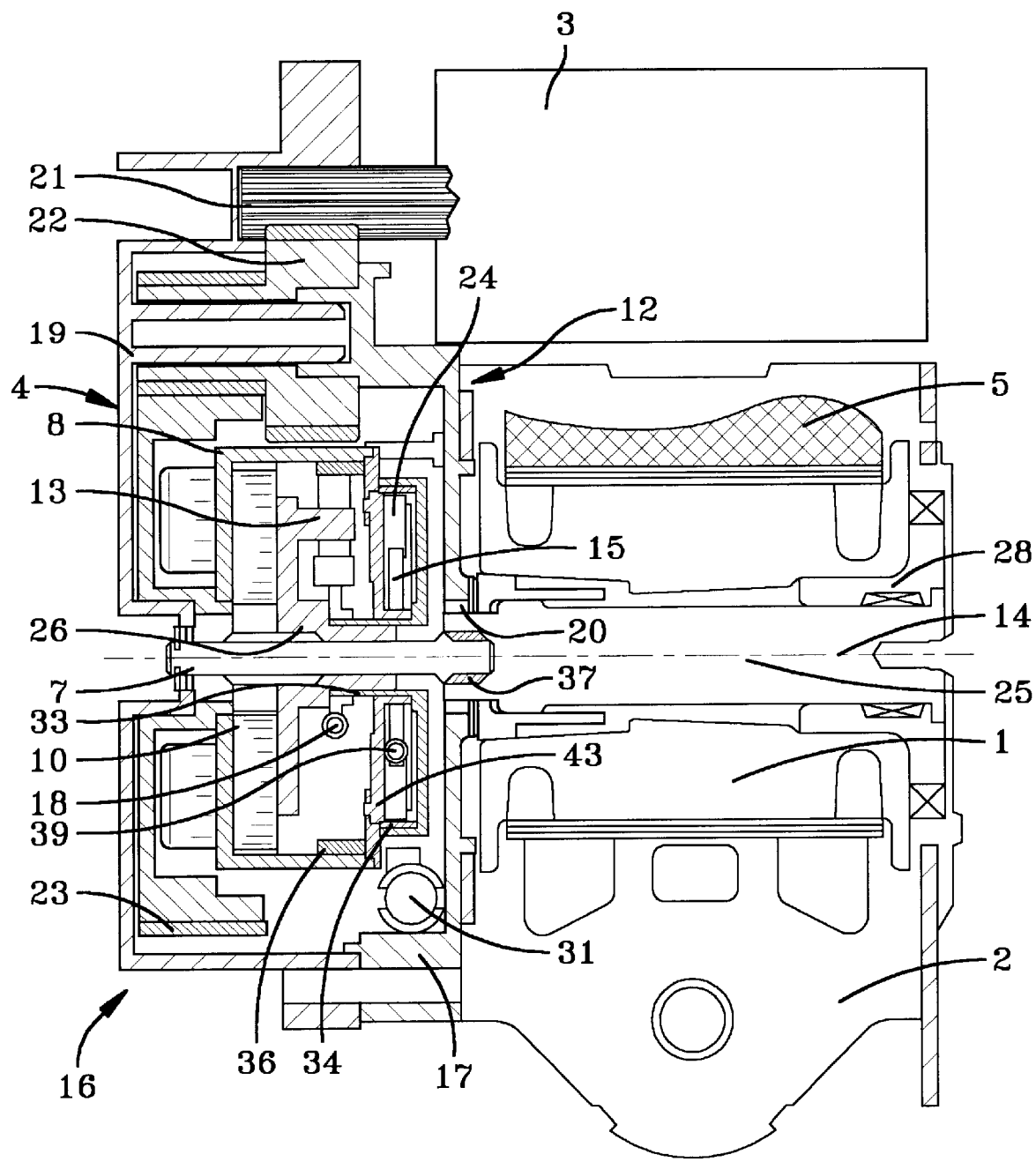
FIG. 5 is a sectional view of a seat belt retractor according to a fifth embodiment of the invention.
Figure 6:
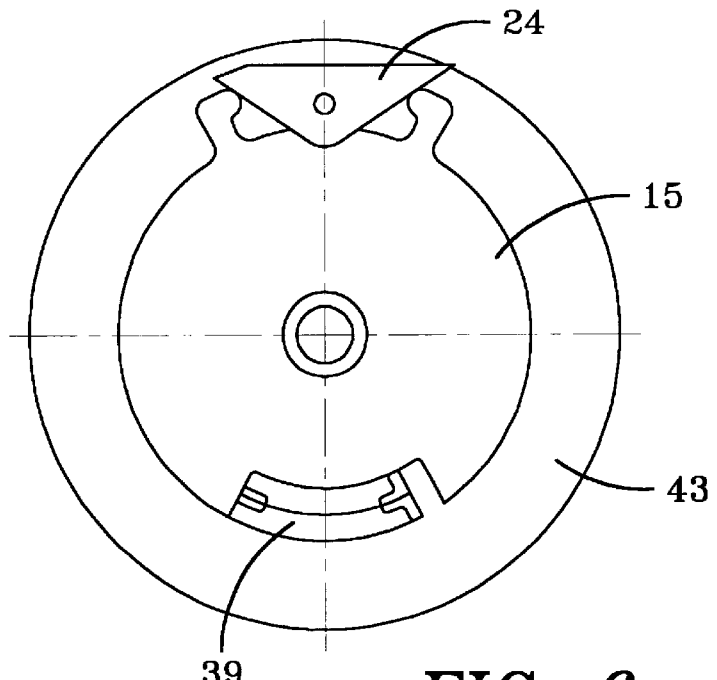
FIG. 6 shows an arrangement of a return spring.

In FIGS. 1, 4 and 5, the load limiter 25 is rotatably mounted at its left end in a pivot bearing 20 at the frame 2 and/or at an adapter plate 17 firmly connected to the frame, the function of which will be described in more detail. The pivot bearing 20 is missing from the embodiments shown in FIGS. 2 and 3 and the axial projection 27 is integrally formed with the load limiter 25 and is rotatably mounted in a housing 19 at its outer end. The housing encloses the entire switching mechanism 4 and is firmly connected to the adapter plate 17. The adapter plate is non-rotatably connected with the frame 2, in particular with the left frame member of the frame of the seat belt retractor. The adapter plate 17 forms an outer side of the motive spring housing 12.

The adapter plate 17 is preferably load bearing, whereby the winding reel 1 can be supported on its one end face on the adapter plate in a pivot bearing, if necessary via the axial projection 38. Alternatively the pivot bearing may not be part of the adapter plate, but the shaft-shaped projection is rotatably mounted and is non-rotatably connected to the winding reel, to a housing that is fixed to the adapter plate and contains the switching mechanism. The reduction gear mechanism, in particular a gear wheel of said reduction gear mechanism, can also be rotatably supported in said housing. Several gear wheels of the reduction gear mechanism can be supported in the housing.

In FIGS. 4 and 5, the carrier 26 forms the side delimitation of the motive spring housing for the coupling element 13. The motive spring housing 12 is completed by the driving part 8, as shown in FIGS. 1 to 5. The driving part also preferably forms the coupling housing, in which the pre-blocking sensor device, comprising the sensor mass 15, the engagement part 24 and the control part 33, as well as the coupling element 13 are housed.

The switching mechanism 4, which is enclosed by the housing 19 and the adapter plate 17, is preferably a modular unit that can be connected to varying types of seat belt retractors by an adapter plate. This modular unit 16 can also support the electric motor 3 with its motor shaft 21. This enables various types of seat belt retractors to be fitted with the switching mechanism and the electric motor.

The adapter plate 17 and preferably also the housing 19 are force absorbent. In particular during the belt tightening, the transmitted torques are absorbed by the adapter plate and housing. For the embodiments of FIGS. 2 and 3, the adapter plate 17 can be a crash bearing collar 40 to support the winding reel or the load limiter. For the embodiments of FIGS. 1, 4 and 5 the pivot bearing 20 provides this effect. Even after power tightening of the seat belt the forces which have been transmitted during the forward displacement of the vehicle occupant from the seat belt to the winding reel 1 are absorbed by the frame 2 as well as the adapter plate 17 and the housing 19.

In a crash, after the power tightening of the seat belt, if the right end of the load limiter 25 is blocked in a known manner against rotating by a blocking device, for instance by a pawl engagement at the frame 2, the winding reel 1, which is non-rotatably connected at the left end via the fixed bearing 27 to the belt load limiter 25 arranged as a torque rod, rotates opposite the firmly held right end of the belt load limiter, once a certain force threshold is exceeded. This rotation takes place when a predetermined pre-set force threshold is exceeded by the force exerted by the seat belt 5 during the forward displacement of the seat-belt-wearing vehicle occupant. This force threshold can be set by the electric motor 3 which, as described above, is coupled to the axial projection 7 when the power tightening occurs and therefore to the left end of the load limiter 25 when the coupling 6 is engaged.

As with the belt tightening, the torque which is transmitted for the setting of the load limiter via the gear mechanism (gear wheels 22, 23), the driving part 6, the engaged coupling element 13, the carrier 26 and the axial projection 7 is transmitted to the load limiter 25. The setting of the load limiter can take place according to characteristic curves, as is known from EP 0893313 A1, for instance.

Instead of one coupling element 13, the carrier 26 can comprise several coupling elements that can be brought into engagement by the control part 33.

The embodiments shown in FIGS. 3 and 5 have an additional sensor 31, which is a vehicle-sensitive sensor. In FIG. 3, the sensor is arranged in a sensor housing 30 at the outer side of the housing 19. The sensor housing comprises a ratchet wheel 29 that is rotatably mounted on the axial projection 7. For rotatable mounting, the ratchet wheel 13 is non-rotatably connected to an axial extension 38 of the control part 33 arranged as a control wheel.

In FIG. 5, the sensor 31 is located inside the modular unit 16 comprising the housing 19 and the adapter plate 17, in close proximity to the adapter plate. The control part 33, arranged as a control wheel, assumes the function of the ratchet wheel. In the event of excessive vehicle acceleration or deceleration, the control part is pre-blocked by the sensor 31 whereby, as was seen in the other embodiments, the coupling element is engaged.

In FIG. 4 the pre-blocking is achieved by an electromagnet 41 that acts upon a ratchet wheel 42 that is rotatably mounted around a rotational axis 14 on the bearing part 43 firmly connected to the driving part 8. A restoring spring 44 operates between the bearing part 43 or the driving part and the ratchet wheel 42. When the ratchet wheel, during the pre-blocking by the electromagnet 41, is firmly held preferably via a frictional contact by a blocking element 45 engaging the ratchet wheel, due to the co-rotation of the engagement part 24 with the driving part 8 driven by the electric motor 3, the axial extension 7 of the winding reel is brought into engagement with the gear teeth 34 on the control part 33 by an actuation part 46 fastened to the ratchet wheel 42. This ensures that the control part 33 continues to rotate and the coupling element 13 engages the gear teeth 36 on the driving part. In FIG. 4, the electromagnet 41 is fastened to the modular unit comprising the housing 19 and the adapter plate 17.

In the represented embodiments, even in the event of a power failure, a characteristically controlled force limiting action is ensured, i.e. a force limiting dependent on the data received from the vehicle occupant wearing the seat belt and the corresponding severity of the crash. This is achieved by the coupling element 13 being engaged by centrifugal or inertial action. When the winding reel 1 and therefore the load limiter 25, and the axial projection 7, which is non-rotatably connected to the left end of the load limiter, are rotated during the forward displacement of the vehicle occupant wearing the seat belt, the carrier 26 which is non-rotatably connected to the projection 7 is also rotated. Due to this rotation, the coupling element can engage the gear teeth 36 on the driving part 8 as a result of centrifugal or inertial action. In this manner, the rotor of the electric motor 3 is coupled to the left end of the load limiter 25 via the gear mechanism (motor shaft 21, gear wheels 22, 23). The left end of the load limiter 25 that co-rotates with the winding reel 1 is coupled to the mass of the rotor of the electric motor via the ratio-increasing gear mechanism in this direction. With the coupling element which can be engaged via centrifugal or inertial force and the control of the coupling element into engagement by the vehicle-sensitive sensor, it is ensured that, even in the case of a power failure, a load limiter connected to the winding reel is coupled by the coupling element to the system which, in accordance with acts as an inertial mass and comprises the gear mechanism and rotor of the electric motor.

The gear mechanism operates between the winding reel and the motor rotor like a ratio-increasing gear. This results in an automatic adjustment of the load-limiting effect dependent on the data received by the seat-belt-wearing vehicle occupant and the respective seriousness of the crash. This ensures an automatic setting of the load limiting action, in the sense disclosed in WO 01/28823, dependent on the data received by the motor vehicle occupant and/or the respective severity of the crash.

In FIGS. 3 and 5, the coupling of the rotor of the electric motor 3 to the load limiter 25 takes place by pre-blocking with the help of the vehicle sensitive sensor 31. Synchronous directing of the coupling element 13 into engagement is achieved with the vehicle-sensitive sensor.

From the foregoing it will be apparent to those skilled in the art that modifications may be made without departing from the spirit and scope of the invention. The claims are intended to embrace all such modifications.

I claim:

1. A seat belt retractor comprising:
   (a) a winding reel rotatably mounted in a frame;
   (b) an electric motor; and
   (c) a switching mechanism with which varying torques can be transmitted to the winding reel to adjust the comfort of a user of a seat belt or to tighten the seat belt, wherein the switching mechanism, depending on a change in number of revolutions or the number of revolutions with which each torque has been transmitted, can be directed into a corresponding switch position, the switching mechanism comprising a coupling device that comprises at least one engageable coupling element that, as a result of an inertial moment of a sensor mass provided at a predetermined distance from the rotational axis of a driving part, can be actuated at a certain number of revolutions or change in number of revolutions of the driving part.

2. The seat belt retractor of claim 1 wherein the coupling device can be disengaged by a restoring force or a change in direction of rotation.

3. The seat belt retractor of claim 2 wherein the restoring force acting upon the coupling device is provided by a restoring spring.

4. The seat belt retractor of claim 1 wherein torque can be transmitted to the winding reel via an axial projection that is non-rotatably connected to the winding reel.

5. The seat belt retractor of claim 4 wherein the coupling device has a driving part that comprises an outer fixing point of a motive spring, which is non-rotatably connected to the projection of the winding reel at an inner fixing point of the projection.

6. The seat belt retractor of claim 5 wherein the driving part of the coupling device is part of a housing for the motive spring.

7. The seat belt retractor of claim 5 wherein the driving part is rotatably mounted on the axial projection of the winding reel.

8. The seat belt retractor of claim 5 wherein when the coupling element is engaged, the driving element is coupled to the winding reel via the coupling element, bridging the motive spring.

9. The seat belt retractor of claim 5 wherein the switching mechanism and the motive spring form a modular unit that is fastened to the frame via an adapter plate.

10. The seat belt retractor of claim 9 further comprising a gear mechanism mounted on the adapter plate, via which the torque is transferred from the electric motor to the winding reel.

11. The seat belt retractor of claim 9 wherein the switching mechanism is arranged in a housing that is fastened to the adapter plate and in which the projection of the winding reel, which is non-rotatably connected or able to be connected with the winding reel, is rotatably mounted.

12. The seat belt retractor of claim 1 wherein the coupling element can be engaged via centrifugal force.

13. The seat belt retractor of claim 1 wherein the coupling element can be engaged via a pre-blocking device.

14. The seat belt retractor of claim 13 wherein the pre-blocking device comprises a sensor mass, via which an engagement part, movably mounted on the driving part, can be brought into engagement with a control part, due to which the coupling element can be re-engaged while the driving part is rotating.

15. The seat belt retractor of claim 13 wherein the pre-blocking device comprises a vehicle-sensitive acceleration sensor, via which the coupling element can be engaged if a crash acceleration or deceleration threshold is exceeded.

16. The seat belt retractor of claim 13 wherein the pre-blocking device comprises an electromagnet.

17. The seat belt retractor of claim 1 wherein torque can be transmitted by the electric motor to the winding reel via a reduction gear mechanism.

18. A seat belt retractor comprising
   (a) a winding reel rotatably mounted in a frame;
   (b) an electric motor; and
   (c) a switching mechanism with which varying torques can be transmitted to the winding reel to adjust the comfort of a user of a seat belt or to tighten the seat belt, wherein the switching mechanism comprising a coupling device, depending on a change in number of revolutions or the number of revolutions with which each torque has been transmitted, can be directed into a corresponding switch position, the coupling element can be engaged via a pre-blocking device that comprises a sensor mass, via which an engagement part, movably mounted on a driving part, can be brought into engagement with a control part, due to which the coupling element can be re-engaged while the driving part is rotating.

* * * * *